March 12, 1940.        W. E. DUERINGER        2,193,192
CONTROL SYSTEM
Filed Jan. 4, 1936        2 Sheets-Sheet 1

INVENTOR.
WALTER E. DUERINGER
BY
Raymond W. Jenkins
ATTORNEY.

March 12, 1940. W. E. DUERINGER 2,193,192
CONTROL SYSTEM
Filed Jan. 4, 1936 2 Sheets-Sheet 2

INVENTOR.
WALTER E. DUERINGER
BY
Raymond W. Junkins.
ATTORNEY.

Patented Mar. 12, 1940

2,193,192

UNITED STATES PATENT OFFICE 2,193,192

CONTROL SYSTEM

Walter E. Dueringer, Shaker Heights, Ohio, assignor to Bailey Meter Company, a corporation of Delaware Application January 4, 1936, Serial No. 57,544

26 Claims. (Cl. 236—14)

This invention relates to control systems for regulating the rate of application of an agent or agents contributing to the production of a variable to maintain the variable at a predetermined value. More particularly my invention relates to fluid pressure actuated control systems wherein a fluid pressure is established in accordance with the magnitude, or departure from a predetermined value, of the variable; and control of the various agents effected through suitable regulators actuated by the fluid pressure.

One object of my invention is to provide a control system wherein an arbitrary high speed repositioning of the regulators for the various agents is effected upon a change in the rate of operation of the devices supplying the agents.

A further object of my invention is to provide a control system instantly correcting for changes in the rate of operation of an agent supplying device, which changes would otherwise produce an alteration in the rate of agent supply beyond that necessary to maintain the variable at the desired value.

A further object of my invention is to provide a control system wherein throughout the duration of transient conditions which produce a marked change in the availability of the agents contributing to the production of a controlled condition a correction is automatically made whereby the rate of supply remains normal at the desired amount.

Still another object of my invention is to provide a control system embodying certain safety features to prevent the establishment of dangerous or hazardous conditions.

A further object of my invention is to provide a control system wherein abnormal transient conditions effect a modification of the normal control for their duration.

A further object of my invention is to provide a control system wherein an abnormal change in the rate of supply of one agent immediately effects a corresponding change in the rate of supply of another agent, so that the desired inter-relation between the agents is continuously maintained.

A more specific object of my invention is to provide a control system wherein upon a change in fan speed, which for example forms a part of the air supply means of a vapor generator, the damper regulating the air supply is immediately positioned so that the rate of air supply during and after the change in speed is substantially the same as before the change.

Further objects will be apparent from the following description and from the drawings in which.

Figure 1:
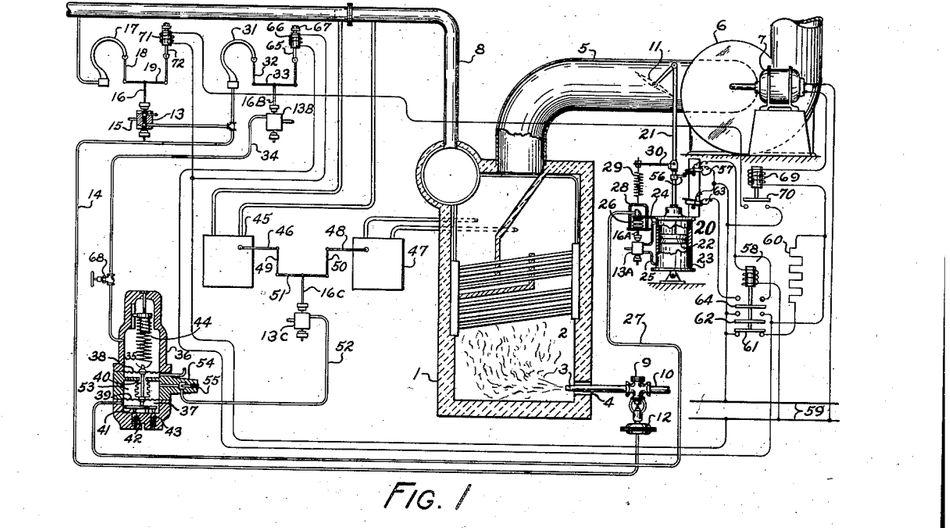
Fig. 1 is a diagrammatic illustration of my invention applied to the control of a vapor generator.

Referring to Fig. 1 I have therein shown my invention applied to the control of a vapor generator 1 having a combustion chamber 2 to which the elements of combustion comprising fuel and air are admitted through a burner 3 and port 4 respectively. The gaseous products of combustion are withdrawn through an uptake or stack 5 by means of a fluid impeller such as a fan 6 driven by a multi-speed motor 7. Generated vapor passes through a conduit 8 to any desired point of usage (not shown). The rate of fuel supply may be regulated by means of a valve 9 positioned in a fuel supply pipe 10; and the rate of air supply may be regulated by means of a damper 11 positioned in the uptake 5. The rate of air supply may be further regulated by varying the speed of the fan 6.

The regulating valve 9 is adapted to be positioned by a diaphragm motor 12 sensitive to fluid pressures established by a pilot valve 13 and transmitted through a pipe 14. The pilot valve 13 is preferably of the type disclosed and claimed in the patent to Clarence Johnson, No. 2,054,464 granted September 15, 1936, and has a longitudinal cylindrical passageway through which a constant flow of pressure fluid from any suitable source (not shown) is maintained from a centrally located inlet port 15 to waste outlets at either end. A movable valve stem 16, centrally located in the passageway, has mounted thereon a pair of spaced suitably shaped valve members having a maximum diameter slightly less than that of the passageway; and each located substantially adjacent to a relatively narrow annular outlet port connected to the exterior of the valve by a suitable passageway. The pressure fluid in passing the valve members establishes a pressure gradient; and the pressure established at the adjacent outlet port depends upon the axial position of the valve member. In the mid or neutral position of the valve stem 16 the pressure at both outlet ports is equal, upward movement of the valve stem producing proportionate increases in pressure at the upper outlet port, and proportionate decreases in pressure at the lower outlet port. Accordingly a loading pressure may be obtained varying directly with the variable to be controlled or inversely thereto depending upon whether the loading pressure established at the upper or lower outlet port is used. The loading pressure so established may be utilized directly as, for example, in Fig. 1 where the loading pressure is transmitted directly from pilot 13 through pipe 14 to the diaphragm motor 12; or it may be utilized to indirectly control the operation of such devices as hereinafter illustrated. With the arrangement shown in Fig. 1 as I desire the loading pressure to vary inversely with vapor pressure, that is, for a given increase in vapor pressure to produce a proportionate decrease in loading pressure, connection is made to the lower outlet port. In practice a suitable plug or stopper may be inserted in the outlet port not in use, or as desired in some cases, connection may be made to both the upper and lower outlet ports.

The valve stem 16 is pivotally connected to a Bourdon tube 17 sensitive to variations in vapor pressure within the conduit 8, by a link 18 and beam 19. As the pressure of the vapor decreases, the valve stem 16 will be positioned downwardly as viewed in the drawings, increasing the loading pressure within the pipe 14 and positioning the valve 9 in an opening direction; conversely, as the pressure of the vapor increases, the valve stem 16 will be positioned upwardly effecting a positioning of the valve 9 in a closing direction.

The damper 11 is positioned by a fluid pressure servomotor generally indicated at 20, and of a type forming part of the subject matter of an application to Clarence Johnson, Serial No. 658,376, filed in the United States Patent Office February 24, 1933, now Patent No. 2,074,696. The damper 11 is linked by a connecting rod 21 to a piston 22 movable in a cylinder 23. Fluid pressure is admitted to the cylinder 23 at opposite sides of the piston 22 through pipes 24 and 25 connected to the upper and lower outlet ports of a pilot 13A similar to pilot valve 13. Accordingly, as the stem 16A moves upwardly from the neutral position, pressure within the pipe 24 increases, whereas that within the pipe 25 decreases, positioning the piston 22 downwardly. Similarly, upon the stem 16A being positioned downwardly from the neutral position, the pressure within the pipe 25 increases, whereas that within the pipe 24 decreases, positioning the piston 22 upwardly.

The valve stem 16A is positioned by a suitable pressure sensitive bellows 26 mounted on a projection of the cylinder 23 and sensitive to pressures within a pipe 27. In order that the damper 11 will be positioned proportional to changes in pressure within the pipe 27 I show the movable end of the pressure sensitive bellows 26 mounted in a stirrup 28 connected by a spring 29 to an arm 30, mounted on the connecting rod 21.

Pressures within the bellows 26 produce downwardly acting forces; whereas those produced by the spring 29 act upwardly. Upon movement of the valve stem 16A downwardly from the neutral position, due to an increase in pressure within the bellows 26, the piston 22 will move upwardly, positioning the damper 11 in an opening direction. Upward movement of the connecting rod 21 will progressively increase the upwardly acting force of the spring 29 upon the bellows 26, which will, when the movement of the piston 22 is in proportion to the change in pressure within the bellows 26 restore the valve stem 16A to the neutral position. It is evident therefore that for each magnitude of pressure within the bellows 26 there will be a corresponding definite position of the piston 22 and damper 11.

As preferably the rate of air supply is varied in parallel with the rate of fuel supply, I provide means for producing pressure variations in the pipe 27 proportional to pressure variations in the pipe 14. To this end I show a Bourdon tube 31 sensitive to pressures within the pipe 14, and pivotally connected to a valve stem 16B of a pilot valve 13B through a link 32 and beam 33. The loading pressure available at the upper outlet port of the pilot valve 13B, which is directly proportional to the pressure within the pipe 14, is transmitted through a pipe 34 to a chamber 35 of an averaging relay 36.

Loading pressures effective through pipe 34 upon chamber 35 are balanced against pressures established in a relay chamber 37, to which the pipe 27 is connected, through the agency of opposed diaphragms 38 and 39, operatively connected by a movable member 40. Admission and discharge of pressure fluid from the chamber 37 is controlled by a pivotally supported, horizontal valve member 41 operating a fluid supply valve 42, connected to a suitable source (not shown), and an exhaust valve 43. The arrangement is such that upon an increase in loading pressure within the chamber 35 the member 40 moves downwardly, opening the fluid pressure supply valve 42 until the pressure within the chamber 37 is equal to, or in desired proportion to, that established in the chamber 35, when the member 40 is restored to the neutral position. The initial pressure relation at which the member 40 is in the neutral position may be varied as desired through the agency of an adjustable spring 44. Pressures within the pipe 27 will bear a definite relation to loading pressures established by the pilot 13B, and accordingly, the damper 11 will be positioned in direct proportion to changes in vapor pressure, and in parallel with the fuel supply valve 9.

As known, for optimum combustion efficiency fuel and air must be supplied in predetermined fixed ratio. To supply air in excess of that required creates a loss due to heating such excess to the temperature of the flue gases. Conversely to supply less air than that required results in incomplete combustion of the fuel. While the combustion control which I have so far described varies the fuel and air together, or in parallel, there is no assurance that the predetermined ratio resulting in optimum combustion efficiency will be maintained throughout the range of operation, due for example to divergence of damper characteristics as compared to valve characteristics. Accordingly, notwithstanding that the rate of air flow may be correlated to the rate of fuel flow at some particular rate of flow of the latter, such ratio may not be maintained at other rates. To assure that air is continuously supplied in correct ratio to the rate of fuel supply, I show in Fig. 1 means for modifying the rate of air supply to maintain the desired ratio. To maintain a predetermined ratio between the rates of air and fuel supply I make use of a relation gage shown and described in Patent 1,257,965 to Bailey. Such a relation gage may be used to determine the ratio between the rate of flow of products of combustion, which as known is an indication of the rate of air supply to the generator; and the rate of flow of vapor which as likewise known is a measure of the rate of fuel supply. I show in Fig. 1 a meter diagrammatically indicated at 45 of the rate of vapor flow through the conduit 8 provided with an indicator 46 adapted to move upwardly upon an increase in the rate of flow of vapor from the generator. A similar meter 47 provided with an indicator 48 measures the rate of flow of the products of combustion through the vapor generator 1. The indicator 48 is adapted to move downwardly as the rate of flow of products of combustion increases.

Depending from the indicators 46 and 48 are links 49 and 50 respectively, pivotally supporting a horizontal link 51. So long as the desired ratio is maintained the mid-point of the horizontal link 51 remains stationary. When, however, the actual ratio of vapor flow to air flow is less than the desired ratio the mid-point of the horizontal link 51 will be lowered proportionately. Conversely when the actual ratio is greater than the desired, the mid-point will be elevated proportionately.

To produce a fluid pressure varying in accordance with deviations of the actual from the desired ratio I show the mid-point of the horizontal link 51 pivotally connected to a valve stem 16C of a pilot valve 13C. The pilot valve 13C is similar to the pilot valve 13 and establishes a loading pressure in an outlet pipe 52 proportional to the ratio between rate of vapor outflow and air flow. As the ratio increases the loading pressure within the pipe 52 decreases, and as the ratio decreases the loading pressure will increase.

The pipe 52 connects to a chamber 53 of the averaging relay 36 through a throttling valve 54 having a movable or adjustable stem 55. Pressures within the chamber 53 serve to modify the pressures within the chamber 35 so that control pressures established within the chamber 37 vary in accordance with the relationship between them. Thus upon an increase in loading pressure within the chamber 35 the rate of air supply will immediately increase proportionately; and so long as the ratio of air flow to vapor flow remains as desired no further change in the rate of air supply will occur. However, if the increase in rate of air flow instigated by the increase in loading pressure within the chamber 35 produces a greater change than that required to maintain the correct ratio the pilot stem 16C will be displaced downwardly effecting a decrease in pressure within the chamber 53, thereby serving to decrease the rate of air supply.

The throttling valve 54 serves to delay the effectiveness of a change in loading pressure produced by a variation in vapor flow-air flow ratio until the change in fuel flow has been effected. Obviously while a change in position of the damper 11 will immediately effect the rate of air supply, a change in fuel flow will not instantly effect a change in the rate of vapor outflow, due to the heat capacity of the vapor generator 1, time required for combustion, etc. Accordingly if the throttling valve 54 was eliminated, a change in the existing position of both the valve 9 and damper 11 dictated by a change in vapor pressure would immediately act to produce the required change in rate of air supply, which would cause a positioning of the indicator 48, producing a change in pressure within the chamber 53, which would serve to nullify the effect of the change in pressure within the chamber 35 produced by the change in vapor pressure and serve to position the damper 11 to the original position. As the valve 9 had originally been positioned in parallel with the damper 11, a deficiency or greater excess of air than required would result, due to the nullifying action of the change in pressure within the chamber 53. The throttling valve 54 therefore serves to delay the action of the ratio sensitive pilot 13C until changes in fuel supply have been reflected in changes in vapor outflow. In general, therefore, the control system shown in Fig. 1 acts to immediately vary both fuel and air in parallel upon a change in vapor pressure and thereafter to readjust the rate of air flow to maintain a desired ratio between rate of vapor outflow and rate of air flow. It is, of course, apparent that certain modifications may be made in the method of control while still employing the same basic principles. Thus, for example, if the combustion chamber 2 was provided with solid fuel on a grate, or in other form, it might then be advisable to vary the rate of air supply in accordance with variations in vapor pressure and readjust the rate of fuel supply in accordance with the ratio between vapor outflow and air supply. The methods of control which I have described are however well known in the art and comprise no part of my present invention.

When the damper 11 is positioned to a substantially wide open position, indicating that the maximum rate of air supply has been reached for the then existing speed of the fan 6, an arm 56 secured to the connecting rod 21 is arranged to close the normally open mercury switch 57. Closure of the switch 57 effects energization of the solenoid relay generally indicated at 58 by a suitable source 59. So long as the switch 57 is open, the motor 7 is connected to the source 59 through a suitable resistance 60 and a relay finger 61. Energization of the solenoid switch 58 acts to cut out the resistance 60 and connect the motor 7 directly to the source 59 through a finger 62 thereby increasing its speed.

To prevent the motor 7 from reverting to the original speed as soon as the damper 11 is positioned to a partially closed position, energization of the solenoid 58 by closure of the mercury switch 57 is arranged to immediately provide permanent energization through a normally closed mercury switch 63 and relay finger 64. Notwithstanding, therefore, that the damper 11 may be moved to a partially closed position opening switch 57, the solenoid 58 will remain energized, thereby maintaining the motor 7 at high speed. When the damper 11 is positioned to a nearly closed position the arm 56 is arranged to open the switch 63, thereby deenergizing the solenoid 58 and reducing the speed of the motor 7 by again introducing the resistance 60 into the circuit.

Operation of the switches 57 and 63 produces an immediate and abnormal change in the rate at which air is supplied the combustion chamber 2. If the correct ratio is to be maintained with respect to the rate of fuel flow, upon a change in speed of the fan 6 damper 11 should immediately be positioned in a direction producing a change in the rate of air supply in opposite sense to that caused by the change in fan speed. The desired operation being for example, that upon an increase in the rate of vapor outflow through the conduit 8 the damper 11 will be positioned in an opening direction until susbtantially wide open, when the switch 57 will close increasing the speed of the fan 6. During the period of transition when the fan 6 is increasing in speed the damper 11 should be positioned proportionately in a closing direction so that the rate of flow of the products of combustion through the uptake 5, and accordingly the rate of air supply to the combustion chamber 2, will remain substantialy constant. The control system which I have thus far described will function to eventually counteract the change in fan speed through the agency of the ratio sensitive pilot 13C, which operates to maintain the desired ratio between the rate of vapor outflow and rate of air supply. However, due to the delayed action produced by the throttling valve 54 for a period of time following the change the rate of air supply will be far in excess, or greatly less, than that required to effect proper combustion for the then existing rate of fuel supply. Such sudden changes in the rate of air supply may also be of sufficient magnitude to snuff out the flame within the combustion chamber, thereby creating a dangerous and hazardous condition.

I provide for positioning of the damper 11 in consonance with changes in speed of the fan 6 whereby the rate of flow of the products of combustion through the uptake 5 remains substantially constant during the period of transition from one fan speed to another. To this end I show pivotally connected to one end of the beam 33 a plunger 65 of a solenoid 66. With the fan motor 7 energized through the resistance 60, the solenoid 66 is deenergized. Upon the solenoid 58 being energized, however, the solenid 66 is connected to the source 59 through the finger 62, moving the plunger 65 downward a predetermined amount depending upon the axial adjustment of nut 67. Downward movement of the plunger 65 produces a similar movement of the pilot stem 16B effecting a decrease of the loading pressure within pipe 34 which is immediately effective through the relay 36 to position the damper 11 in a closing direction. By proper adjustment of the nut 67 the change in loading pressure effected within the pipe 34 may be made sufficient to substantially counteract or annul the change in rate of flow of the products of combustion through the uptake 5 due to the change in speed of the fan 6.

If now the pressure of the vapor within the conduit 8 should increase, the damper 11 would be positioned further in a closing direction until at some predetermined point the arm 56 opened the mercury switch 63, deenergizing the solenoid 58. Such deenergization would disconnect the solenoid 66 from the source 59 and the plunger 65 would move upwardly, increasing the loading pressure within the pipe 34, which through relay 36 would effect a positioning of the damper 11 in an opening direction sufficient to counteract the decrease in the rate of flow of products of combustion through the uptake 5 caused by the decrease in speed of the fan 6. The rate of change in the rate of flow of the products of combustion caused by the positioning of the damper 11 may be made substantially equal to that effected by the acceleration or deceleration of the fan 6 by proper adjustment of a throttling valve 68 interposed in the pipe 34. The throttling valve 68 serves to vary the rate of positioning of the damper 11 so that during the period of transition from one fan speed to another the rate of flow of the products of combustion, and accordingly the rate of air supply to the furnace, remains substantially constant.

In the event of failure of the fan 6 or motor 7 resulting in the stoppage of the flow of products of combustion through the uptake 5 it is desirable that the flow of fuel to the furnace be immediately cut off to prevent the establishment of an explosive mixture therein. To provide for the stoppage of fuel flow in the event of fan or motor failure I show a solenoid generally indicated at 69 connected in the electrical circuit which includes the motor 7. Normally the solenoid 69 is energized and finger 70 is open. Upon failure of the fan 6 or motor 7 the solenoid 69 will be deenergized due to the opening of the usual circuit breakers, thermal cut-outs, or other protective means (not shown) connected in the circuit of the motor 7. Such deenergization will result in closure of the finger 70, which will permit energization of a solenoid 71 having a movable plunger 72 pivotally connected to one end of the beam 19. Energization of the solenoid 71 will effect upward positioning of the valve stem 16 in an amount sufficient to decrease the loading pressure established in the pipe 14 to position the valve 9 to a tight closed position, thereby completely stopping the flow of fuel to the furnace. Simultaneously the valve stem 16B will be positioned downwardly, decreasing the pressure within the pipe 34 a sufficient amount to position the damper 11 to a minimum position. Reenergization of the electrical circuit of the motor 7 will result in the solenoid 69 opening the finger 70 and permitting the control system to function in normal manner.

Figures 2, 3:
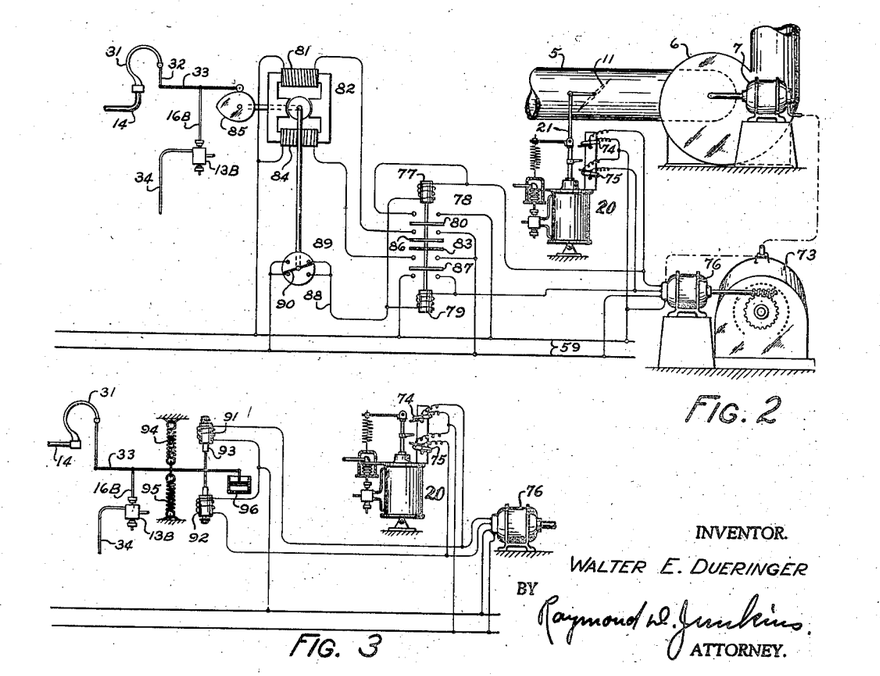
Fig. 2 is a modification of my invention as illustrated in Fig. 1.
Fig. 3 illustrates another modified form of my invention over that illustrated in Fig. 1.

In Fig. 2 I show a modified form of my invention adapted to effect proper repositioning of the damper 11 when the speed of the motor 7 is controlled by a drum controller such as indicated at 73. As known a drum controller may be provided with a desired number of resistances, circuit modifying devices, etc. (not shown) whereby the speed of a motor may be progressively varied through any desired number of steps.

In Fig. 2 the connecting rod 21 is arranged to momentarily close normally open mercury switches 74 and 75 at extreme positions of the damper 11. The switches 74 and 75 are arranged to control the starting of a reversible pilot motor 76 operatively connected to the drum controller 73 through suitable gearing. The pilot motor 76 may be provided with suitable running switches as known so that upon being energized through the momentary closure of switch 74 or 75 operation will continue until the drum controller advances one notch, whereupon further operation will cease until there is a further momentary closure of switch 74 or 75. Upon closure of the switch 74 the reversible motor 76 will be operated in a direction to increase the speed of the motor 7, whereas upon closure of the switch 75 the reversible motor 76 will be operated to decrease the speed of the motor 7.

To provide for the repositioning of the damper 11 upon a change in speed of the motor 7 I have provided means for progressively modifying the loading pressure established by the pilot 13B in accordance with the speed of the motor 7. Adapted to be energized by the switch 74 is a solenoid 77 of the double acting solenoid switch generally indicated at 78. The opposite solenoid 79 is adapted to be energized by closure of the switch 75. Energization of the solenoid 77 closes the finger 80, thereby connecting a field 81 of a reversible motor 82 to the source 59. Conversely energization of the solenoid 79 affects closure of the finger 83, energizing opposed field 84, causing rotation of the motor 82 in opposite direction.

Rotation of the motor 82 through energization of the field 81 effects clockwise positioning of the beam 33 through the agency of a suitable cam 85 operatively connected to the rotor of the motor 82 through suitable reduction gearing. Energization of the field 84 effects counterclockwise positioning of the beam 33. Such positioning of the beam 33 is effective for progressively modifying the pressure within the pipe 34.

In order that the loading pressure within the pipe 34 will be modified sufficiently to position the damper 11 to substantially counteract the change in rate of flow of the products of combustion through the uptake 5 caused by a change in speed of the motor 7, the relay 78 may be provided with a finger 80 which upon energization of the solenoid 77 will sustain energization notwithstanding the fact that the switch 74 may be opened due to the repositioning of the damper 11. A similar sustaining finger 87 is provided for the solenoid 79. The solenoids 77 and 79 are connected to one side of the source 59 through a common conductor 88 in which is connected a snap switch diagrammatically indicated at 89, and provided with a movable member 90 operatively connected to the motor 82.

In operation, upon the damper 11 being positioned to a nearly wide open position the switch 74 will close, starting operation of the pilot motor 76 which will continue until the drum controller 73 has advanced one notch, increasing the speed of the motor 7. Simultaneously the solenoid 77 will be energized, effecting through finger 86 energization of the field 81. Rotation of the motor 82 will then occur in a direction to position the pilot valve stem 16B downwardly, effecting a decrease in loading pressure within the pipe 34, immediately effecting a positioning of the damper 11 in a closing direction. Opening of the switch 74 will not effect deenergization of the solenoid 77, however, due to the sustaining finger 80 which provides for the energization of the solenoid 77 from the source 59. Rotation of the motor 82 will also eventually throw the movable member 90 of the snap switch 89, thereby effecting deenergization of the solenoid 77 and field 81. By proper shaping of the cam 85 the downward positioning of the valve stem 16B can be made just sufficient to substantially counteract or annul the increase in rate of flow of the products of combustion through the uptake 5 due to the increase in speed of the fan 7.

If due to a further decrease in vapor pressure within the conduit 8 the damper 11 is again positioned to a nearly wide open position, the switch 74 will again be energized and the above procedure repeated. Upon a positioning of the damper 11 to a nearly closed position the switch 75 is closed, which is effective for starting the motor 76 in opposite direction and which will continue to operate until the drum controller 73 has been retarded one notch. Simultaneously the solenoid 79 will be energized effecting through the finger 83 energization of the field 84, causing an upward positioning of the pilot valve stem 16B. Such upward positioning will effect an increase in loading pressure within the pipe 34, thereby positioning the damper 11 in an opening direction sufficient to counteract the decrease in rate of flow of the products of combustion caused by the decrease in speed of the motor 7. Upon the loading pressure within the pipe 34 having changed a predetermined amount, the movable member 90 will operate to deenergize the solenoid 79, thereby deenergizing the field 84.

In Fig. 3 I disclose a further modified form of my invention over that illustrated in Fig. 2. Herein the normally open switches 74 and 75 are adapted to momentarily energize solenoids 91 and 92 respectively upon closure. The solenoid 91 is pivotally connected to the beam 33 and upon energization an associated plunger 93 will be positioned downwardly, effecting a similar positioning of the pilot valve stem 16B, thereby decreasing the loading pressure within the pipe 34 and effecting a positioning of the damper 11 in a closing direction. Upon the damper 11 moving in a closing direction the switch 74 will be opened, deenergizing the solenoid 91. The plunger 93 will not however immediately return to the deenergized position to which it is urged through the action of springs 94 and 95, but such action will be delayed due to the retarding effect of dashpot arrangement 96. The arrangement serves, therefore, to position the damper 11 in a closing direction upon an increase in speed of the fan 6 and thereafter to gradually remove the effect causing such closure, allowing the damper 11 to again come under the normal control sensitive to variations in pressure within the conduit 8 and variations in the ratio between the rate of vapor outflow and rate of air supply. By proper adjustment of the dashpot 96 the rate at which the loading pressure within the pipe 34 is permitted to return to normal may be made equal to the rate at which variations in the rate of air supply affect the pressure within the chamber 53 of the relay 36. Upon an increase in fan speed therefore, and a repositioning of the damper 11 to a partially closed position under the influence of the solenoid 91, no further positioning of the damper 11 will occur except as indicated as necessary through further variations in vapor pressure, as increases in pressure within the pipe 34 and chamber 35 of the average relay 36 due to the gradual restoration of the plunger 93 to the deenergized position will be counterbalanced by corresponding decreases in pressure within the chamber 53 upon the ratio of vapor flow to air flow tending to depart from that desired.

Closure of the switch 75 effects opposite action through energization of the solenoid 92, which effects an increase in pressure within the pipe 34, causing the damper 11 to be positioned in an opening direction. Upon opening of the switch 75 the solenoid 92 is deenergized and the beam 33 gradually permitted to return to the normal position under the influence of springs 94 and 95.

Figures 4, 6, 7, 8:
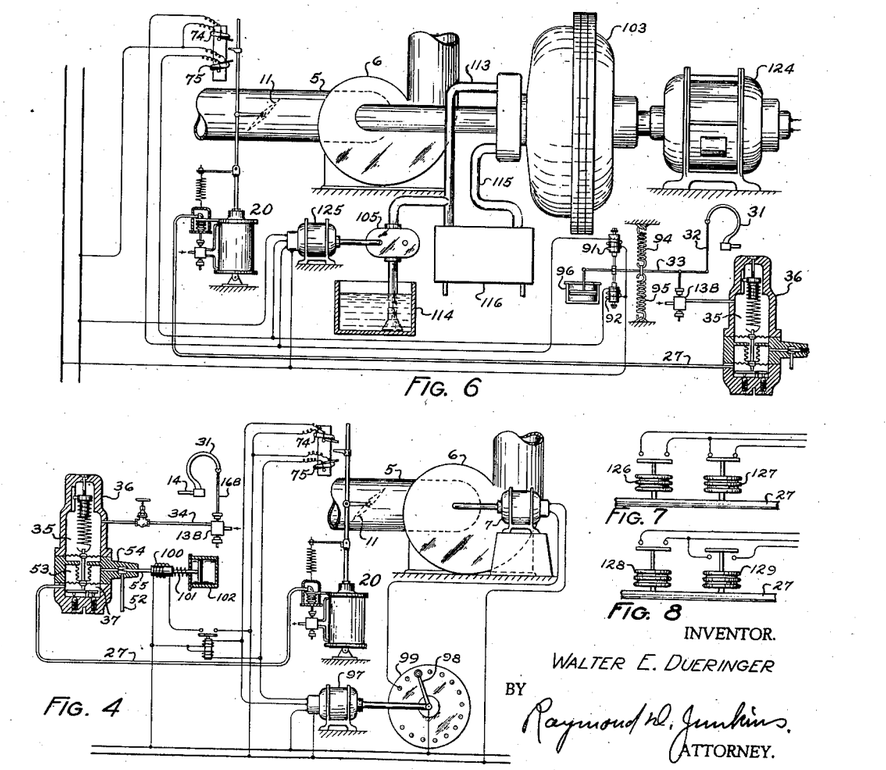
Fig. 4 illustrates a further modified form of my invention over that illustrated in Fig. 1.
Figs. 5 and 6 are modifications of my invention in connection with hydraulic couplings.
Figs. 7 and 8 illustrate substitute forms of switches which may be used with my control system.

In Fig. 4 I show a further modified form of my invention wherein I automatically remove the throttling action of the valve 54 during fan speed changes, so that as the rate of flow of the products of combustion changes, as a result thereof, an immediate proportionate change in the loading pressure within the chamber 53 occurs and serves to position the damper 11 in a direction to prevent such changes. The Bourdon tube 31 is shown directly connected to the pilot valve stem 16B of the pilot valve 13B and serves to vary the loading pressure established within the chamber 35 of the relay 36 in accordance with variations in vapor pressure within the conduit 8. Such variations in loading pressure effect corresponding variations of pressure in the control chamber 37 which act through the pipe 27 for positioning the damper 11. Upon the damper 11 being positioned to an open or closed position the switch 74 or 75, respectively, is closed, producing operation of a reversing pilot motor 97, provided with suitable running switches (not shown), in proper direction to produce a desired increase or decrease in speed of the fan 6. To effect this end the pilot motor 97 is shown operatively connected to a movable arm 98 of a rheostat 99 connected in the circuit of the motor 7. Closure of the switch 74 may for example serve through the pilot motor 97 to reduce the effective resistance connected in circuit with the motor 7. Likewise closure of the switch 75 may serve to increase the effective resistance connected in circuit with the motor 7.

Connected in parallel with the circuits of the pilot motor 97 and adapted to be energized by either the switch 74 or 75 is a solenoid 100 having a plunger 101 connected to the movable stem 55 of the throttling valve 54. Upon closure of either the switch 74 or 75 the solenoid 100 is energized, moving the stem 55 to the right as viewed in the drawings, thereby removing the throttling action of the valve 54. Loading pressures produced by the pilot 13C are thereby immediately effective within the chamber 53 and immediately effect a positioning of the damper 11. Accordingly as the speed of the fan 6 is accelerated, or decelerated, destroying the correct ratio between rate of vapor outflow and rate of air supply, the loading pressure produced by the pilot 13C is proportionately varied, but in a direction positioning the damper 11 to change the rate of flow of the products of combustion in opposite sense to that caused by the change in speed of the fan 6. Such positioning of the damper 11 will continue until the correct ratio between vapor flow and air flow is reestablished.

Upon the damper 11 being positioned in response to variations in the loading pressure within the chamber 37 the switch 74 or 75, as the case may be, will be opened, deenergizing the solenoid 100. To prevent the quick return of the stem 55 to the normal position before the correct ratio of vapor flow to rate of air flow is reestablished I show connected to the plunger 101 a dashpot generally indicated at 102. The dashpot 102 serves to retard the return of the stem 55 to the normal position, thereby permitting the fan speed change and positioning of the damper to counteract such change to be consummated before the retarding action effected by the valve 54 is again made effective.

Figure 5:
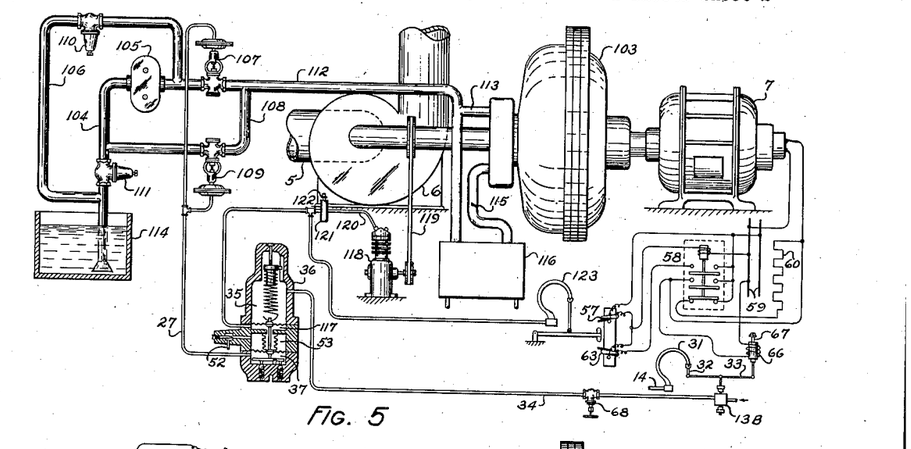

In Fig. 5 I show a modified form of my invention adapted to a system wherein regulation of the rate of flow of the products of combustion through the uptake 5 is secured by varying the output shaft speed of a hydraulic coupling 103 driven by the variable speed motor 7. As known, the output shaft speed of a hydraulic coupling may be varied as desired by altering the quantity of hydraulic fluid within the coupling. Thus increases in the volume of hydraulic fluid within the coupling effect proportionate increases in the output shaft speed, and when the internal passages are completely filled the output shaft speed will be slightly less than the input shaft speed. Conversely, decreases in the volume of hydraulic fluid effect proportionate reductions in output shaft speed and when the coupling is empty of fluid the output shaft speed will usually be in the nature of 20% of the input shaft speed, the exact percent depending upon coupling design.

To further increase the range in fan speed available, the coupling may be driven as shown by a variable speed motor. To prevent sudden increases or decreases in fan speed when a change is made in motor speed it is desirable to immediately vary the quantity of the hydraulic fluid in the coupling to counteract changes in fan speed caused by changes in motor speed. Such changes in the quantity of hydraulic fluid within the coupling are preferably accomplished in synchronism with the acceleration or deceleration of the motor, so that during the period of transition the fan speed remains substantially constant.

To provide for varying the quantity of oil within the hydraulic coupling 103 in accordance with vapor pressure changes and deviations in the ratio between rate of vapor outflow and rate of air flow, I may employ apparatus forming a part of the subject matter of an application of Harry E. Weaver, Serial No. 27,425, filed in the United States Patent Office, June 19, 1935 now Patent No. 2,116,922. In accordance therewith a substantially constant circulation of hydraulic fluid is maintained through a circuit comprising a portion of a pump suction pipe 104, continuously running pump 105, and a bypass line 106. Similarly a constant circulation of hydraulic fluid is maintained through a circuit comprising a diaphragm valve 107, pipe 108, diaphragm valve 109, and a portion of the pump suction pipe 104. The pressure differential across the valves 107 and 109 may be held constant by suitable regulating valves 110 and 111. So long as the speed of the fan 6 is at the desired value, the flow through the diaphragm valve 107 to the pipe 108 is equal to the flow from the pipe 108 through the diaphragm valve 109 to the suction pipe 104. When, however, it is desired to increase the speed of the fan 6 for example, the diaphragm valve 107 is positioned in an opening direction, whereas the diaphragm valve 109 is simultaneously positioned in a closing direction thereby increasing the flow of hydraulic fluid to the pipe 108 above that therefrom. The difference is transmitted through a pipe 112 to the coupling inlet tube 113. Such increase in quantity of oil within the coupling 103 is effective for increasing the speed of the fan 6. Conversely, when it is desired to decrease the speed of the fan 6 the diaphragm valve 107 is positioned in a closing direction whereas the valve 109 is positioned in an opening direction, thereby increasing the flow of oil from the pipe 108 above that thereto, serving to withdraw oil from the hydraulic coupling 103. A reservoir 114 is provided wherein excess oil over that required may be stored. The hydraulic fluid within the coupling 103 may be maintained at a desired temperature by providing a constant circulation from a suitable outlet 115 and heat exchanger 116 to the inlet 113.

The diaphragm valves 107 and 109 are shown adapted to be positioned by the control pressure established within the pipe 27 in accordance with variations in vapor pressure and deviations in the ratio between rate of vapor outflow and rate of air supply from the desired value. In order that a given change in loading pressure within the chamber 35 or chamber 53 of the averaging relay 36 will produce a definite change in speed of the fan 6 without overtravel or hunting; the control pressure within the pipe 27 may be made proportional to the difference between the desired and actual speed of the fan 6 through the agency of the averaging relay 36. This may be accomplished by producing, through a suitable speed responsive device, a loading pressure in a chamber 117 of the averaging relay 36 proportional to the speed of the fan 6. Accordingly, the difference between the pressures within the chamber 117 and chambers 35 and 53 will be effective against the pressure established in the control chamber 37, so that the pressure transmitted through the pipe 27 to the diaphragm valves 107 and 109 will be proportional to the difference between desired and actual speed. As the latter approaches the former the diaphragm valves 107 and 109 are gradually brought to the neutral position when the flow through the valve 107 into the pipe 108 is equal to the flow therefrom through the valve 109.

A fluid pressure proportional to the speed of the fan 6 may be produced by a device forming the subject matter of an application of Paul S. Dickey entitled "Measuring and control systems", filed in the United States Patent Office on June 19, 1935, Serial No. 27,426 now Patent No. 2,141,082. In accordance therewith a fluid compressor 118 is driven through suitable belt means 119 from the shaft of the fan 6. Connected in a discharge line 120, running to the chamber 117, is a chamber 121 provided with a fixed orifice 122 of such size that the pressure of the atmosphere is below the critical pressure for the pressure within the discharge line 120. Inasmuch as the volume of fluid compressed varies directly with the speed of the compressor 118 it follows from Napier's Law that the pressure in the discharge line 120 will likewise be proportional to speed. Accordingly pressures within the chamber 117 will be proportional to the speed of the fan 6.

Under normal operation with the speed of the motor 7 remaining constant, variations in vapor pressure or a deviation in the ratio between rate of vapor outflow and rate of air supply from that desired will effect positioning of the diaphragm valves 107 and 109 to vary the quantity of hydraulic fluid in the coupling 103 to produce a change in speed of the fan 6 in desired sense and amount. When the speed of the fan 6 has reached a minimum or maximum value for the then existing speed of the motor 7, I provide means for automatically changing the speed of the motor 7 and simultaneously varying the quantity of hydraulic fluid in the coupling so that the speed of the fan 6 remains substantially constant throughout the period of transition. To this end I show connected to the pipe 120 a Bourdon tube 123 adapted to actuate the switches 57 and 63 at predetermined maximum and minimum pressures respectively. When the hydraulic coupling 103 is completely filled a definite speed of the fan 6 will be obtained, which will produce a predetermined loading pressure within the pipe 120. The Bourdon tube 123 may be adjusted so that when this pressure obtains the switch 57 is closed. Similarly when the hydraulic coupling 103 is substantially empty of fluid, resulting in a definite minimum speed of the fan 6 the Bourdon tube 123 may be adjusted to open the switch 63. Closure of the switch 57 effects an increase in speed of the motor 7 through the solenoid 58 and simultaneously serves to energize the solenoid 66, whereby the plunger 67 is positioned downwardly decreasing the loading pressure effective within the chamber 35 and resulting in the diaphragm valves 107 and 109 being positioned in a direction to withdraw fluid from the coupling 103, thereby tending to reduce the speed of the fan 6. Conversely, opening of the switch 63 serves to reduce the speed of the motor 7 and simultaneously to effect an upward positioning of the plunger 67, thereby producing an increase in speed of the fan 6 equal to the decrease effective through the reduction in speed of the motor 7.

In Fig. 6 I show a modified form of my invention wherein control of the rate of products of combustion is effected through the damper 11 and fan 6 operated by the hydraulic coupling 103, which is driven by a constant speed source of power such as a motor 124. Changes in the quantity of hydraulic fluid within the coupling to effect desired speed changes of the fan 6 are obtained through actuation of the pump 105 in proper direction to introduce fluid from the reservoir 114 to the inlet pipe 113, or to withdraw oil from the inlet 113 and return it to the reservoir 114. Operation of the pump 105 in proper direction is obtained through a reversible motor 125 controlled through the normally open switches 74 and 75. The motor 125 may be provided with suitable running switches so upon energization it will continue to run until the quantity of oil in the hydraulic coupling is changed a predetermined amount.

The damper 11 is positioned through changes in control pressure established by the relay 36 and upon being positioned to a substantially open position effects closure of the switch 74, which energizes the motor 125 in proper direction to introduce hydraulic fluid into the coupling 103. Simultaneously closure of the switch 74 effects energization of the solenoid 91, which serves as hereinbefore described to modify the loading pressure established in the chamber 35 in proper sense to position the damper 11 in a closing direction a sufficient amount to counteract the change in rate of flow of the products of combustion effected through the increase in speed of the fan 6. Upon repositioning of the damper 11 the switch 74 is opened, deenergizing the solenoid 91. Gradually the beam 33 is then restored to the neutral position under the influence of springs 94 and 95 and dashpot 96.

Upon a closure of the damper 11 to a predetermined minimum position the switch 75 is closed, effecting energization of the motor 125 in proper direction to withdraw fluid from the hydraulic coupling 103 and simultaneously energize the solenoid 92, thereby effecting a modification of the loading pressure within the chamber 35 in proper sense to effect a positioning of the damper 11 in an opening direction a sufficient amount to counteract the change in rate of flow of the products of combustion effected by the decrease in speed of the fan 6. Thereafter upon the mercury switch 75 being opened, the solenoid 92 is deenergized, permitting the beam 33 to be gradually restored to the neutral or normal position.

In the modifications of my invention I have chosen to illustrate and describe, I may in place of utilizing a direct indication of the damper 11 to energize or deenergize the control circuit employ a more or less indirect indication. For example, referring to Fig. 7 I have shown connected to the pipe 27 pressure sensitive switches 126 and 127. The pressure switch 126 is adapted to close when the pressure within the pipe 27 reaches a predetermined maximum value, and pressure switch 127 is adapted to open when the pressure reaches a predetermined minimum value. It is apparent that the pressure within the pipe 27 is an indication of the damper position 11 inasmuch as for every value of the pressure there is a definite damper position. Accordingly the switch 126 may be substituted for the switch 57 and the switch 127 substituted for switch 63.

In Fig. 8 I have shown normally open pressure switches 128 and 129 sensitive to the pressure within the conduit 27. It is apparent that the switch 128 may be substituted for the switch 74; and the switch 129 for the switch 75.

The term "control couple" as used in the appended claims refers to a device such as a pilot valve illustrated at 13 or 13b. This device has a valve stem and a valve body relatively movable and it is through the relative movement of these two elements that a fluid pressure proportional to the controlled condition is obtained. The term "control couple" is not limited to a pilot valve however, but the term is intended to include substantially any sensitive device which is used to establish or produce a control force, whether that control force be a fluid pressure, an electromotive force, or periodic electric impulses of a time length proportional to the magnitude of the controlled condition.

While in the foregoing description I have described certain forms of my invention, it is apparent that it may be embodied in further forms and modifications; that it is not limited to the control solely of vapor generators but may be applied to any apparatus wherein an agent or agents contributing to the production or maintenance of a condition are supplied through supply means having a plurality of rates of operation.

What I claim as new, and desire to secure by Letters Patent of the United States, is:

1. A fluid pressure control system comprising a control couple having relatively movable elements for governing the fluid pressure in the system, means for positioning one of said elements responsive to the magnitude of a controlled condition, a regulator for an agent affecting said condition positioned by said fluid pressure, and electromagnetic means under the control of said regulator and mechanically connected to one of said elements for relatively moving said elements at a predetermined position of said regulator.

2. A fluid pressure control system comprising a control couple having relatively movable elements for governing the fluid pressure in the system, means for positioning one of said elements responsive to the magnitude of a controlled condition, means for supplying an agent affecting the condition having a plurality of rates of operation, a regulator positioned by said fluid pressure for modifying the rate of supply of said agent in accordance with variations in the magnitude of the controlled condition, and means actuated at predetermined positions of said regulator to vary the rate of operation of said supply means and means actuated by said regulator independently of the change in rate of operation of said supply means to simultaneously vary said fluid pressure to position said regulator to effect a substantially equal change in the rate of supply of said agent as effected by the change in rate of operation of said supply means but in opposite sense.

3. A fluid pressure control system comprising a control couple having relatively movable elements for governing the fluid pressure in the system, means for relatively moving said elements in response to changes in the magnitude of a controlled condition, means for supplying an agent affecting the condition having a plurality of rates of operation, a regulator positioned by said fluid pressure for modifying the rate of supply of said agent in accordance with variations in the magnitude of the controlled condition, means for changing the rate of operation of said supply means at a predetermined position of said regulator and means actuated independently of the change in rate of operation of said supply means for simultaneously modifying the fluid pressure to effect a change in position of said regulator to substantially counteract the change in rate of agent supply effected by said change in rate of operation; and means operated at a different predetermined position of said regulator for reverting said supply means to the original rate of operation and means actuated independently of the change in rate of operation of said supply means for simultaneously modifying the fluid pressure to effect a change in position of said regulator to substantially counteract the change in rate of agent supply effected by said change in rate of operation.

4. A fluid pressure control system comprising a control couple having relatively movable elements for governing the fluid pressure in the system, means for positioning one of said elements responsive to the magnitude of a controlled condition, means for supplying an agent affecting the condition having a plurality of rates of operation, a regulator positioned by said fluid pressure for modifying the rate of supply of said agent in accordance with variations in the magnitude of the controlled condition, means actuated at predetermined positions of said regulator to vary the rate of operation of said supply means, means for simultaneously moving one of said elements to vary said fluid pressure to counteract the change in rate of supply of said agent caused by said change in rate of operation of said supply means; and retarded means for annuling said last named change in fluid pressure.

5. A fluid pressure control system comprising a control couple having relatively movable elements for governing the fluid pressure in the system, means for positioning one of said elements responsive to the magnitude of a controlled condition, means for supplying an agent affecting the condition having a plurality of rates of operation, means for producing a second fluid pressure in accordance with the rate of supply of said agent, a relay for producing a third fluid pressure in accordance with a function of the sum of said first two fluid pressures, means for retarding the effect of said second fluid pressure in said relay, a regulator for said agent positioned by said third fluid pressure, means actuated at predetermined positions of said regulator to vary the rate of operation of said supply means; and means for simultaneously rendering said retarding means non-effective.

6. In combination, a duct, a multi-speed fan for producing a flow of fluid in said duct, a damper in said duct, a servo-motor for positioning said damper, and means under the control of said servo-motor for changing said fan speed when said damper reaches predetermined positions and simultaneously operating said servo-motor to position said damper to effect a change in flow of fluid through said duct in opposite direction to that caused by the change in fan speed.

7. In combination, a duct, a multi-speed fan for producing a flow of fluid in said duct, a damper in said duct, a fluid pressure actuated servo-motor for positioning said damper, means under the control of said servo-motor for changing fan speed when said damper reaches a predetermined position; and means also controlled by said servo-motor for simultaneously changing the fluid pressure effective in said servo-motor to position the damper to counteract the change in flow of fluid caused by the said change in fan speed.

8. In a combustion control system for a vapor generator, in combination, air supply means having a plurality of rates of operation, regulating means for the air supply, means for producing a first fluid pressure in proportion to the pressure of the vapor generated, a servo-motor sensitive to said fluid pressure for positioning said regulating means, and means actuated by said regulating means independently of said change in rate of operation of said air supply means, for changing the magnitude of the fluid pressure for a given magnitude of vapor pressure predetermined amounts upon changes in the rate of operation of said air supply means.

9. In a combustion control system for a vapor generator, in combination, fuel and air supply means, means for producing a fluid pressure in accordance with vapor pressure, a regulator for the air supply under the control of said fluid pressure, means under the control of said regulator for varying the rate of operation of said air supplying means, and means simultaneously operated by said regulator independently of the change in speed of air supplying means for varying the fluid pressure to effect a change in the rate of air supply in opposite direction to that caused by the change in the rate of operation of the air supply means.

10. In a combustion control system for a vapor generator, in combination, a fan for supplying air to the generator, a multi-speed motor for operating said fan, a damper for regulating the rate of air supply, a servo-motor for operating said damper, means for establishing a fluid pressure in accordance with a condition affected by the rate of air supply for controlling said servo-motor, and means operated by said servo-motor at predetermined positions for varying the speed of said motor and simultaneously independently of said change in fan speed modifying said fluid pressure to effect a change in position of said damper.

11. In a combustion control system for a vapor generator, in combination, air supply means having a plurality of rates of operation, regulating means for the air supply, means for producing a first fluid pressure in accordance with the vapor pressure, means for producing a second fluid pressure in accordance with the ratio between rate of vapor outflow and rate of air supply, a relay for producing a third fluid pressure in accordance with the magnitude of the first and second fluid pressures, a servo-motor actuated by the third fluid pressure for positioning said regulating means, means for retarding the admission of said second fluid pressure to said relay, and means for rendering said retarding means ineffective for an increment of time upon a change in the rate of operation of said air supply means.

12. In combination, a hydraulic coupling having an output shaft, a duct, a fan connected to said duct and driven by said output shaft, a damper in said duct, a servo-motor for positioning said damper, means for producing a fluid pressure effective for actuating said servo-motor, means actuated by said servo-motor at predetermined positions of said damper for varying the hydraulic fluid in said coupling to effect a change in fan speed and simultaneously change said fluid pressure to effect a positioning of said damper to counteract the said change in fan speed; and retarded means for subsequently annuling said change in fluid pressure.

13. In combination, a hydraulic coupling having an output shaft, a multi-speed motor for driving said coupling, a tachometer for producing a first fluid pressure in accordance with the output shaft speed, means for producing a second fluid pressure, a relay for producing a third fluid pressure bearing a functional relation to the algebraic sum of the first and second fluid pressures, means actuated by said third fluid pressure controlling the admission and discharge of hydraulic fluid to the coupling, and means sensitive to a predetermined value of the first fluid pressure for changing said motor speed and simultaneously modifying the second fluid pressure to effect a change in speed of said output shaft in opposite sense to that caused by the change in motor speed.

14. In combination, a hydraulic coupling having an output shaft, a multi-speed motor for driving said coupling, means for producing a fluid pressure, means actuated by said fluid pressure controlling the admission and discharge of hydraulic fluid to and from the coupling, and means sensitive to a predetermined value of the fluid pressure for changing said motor speed and simultaneously independently of the change in output shaft speed caused by the change in motor speed varying the hydraulic fluid in said coupling to vary the speed of the output shaft in opposite sense to that caused by the change in motor speed.

15. In combination, a hydraulic coupling having an output shaft, a fluid impeller driven by said output shaft, means for producing a fluid pressure, a regulator of the fluid passing through said impeller positioned in accordance with said fluid pressure; and means actuated by said regulator at predetermined positions for varying the hydraulic fluid in said coupling and simultaneously varying said fluid pressure to position said regulator to effect a change in fluid flow in opposite sense to that caused by said variation in hydraulic fluid.

16. In combination, a hydraulic coupling having an output shaft, a duct, a fan connected to said duct and driven by said output shaft, a damper in said duct, a servo-motor for positioning said damper, means for producing a fluid pressure effective for actuating said servo-motor, and means actuated by said servo-motor at predetermined positions of said damper for varying the hydraulic fluid in said coupling to effect a change in fan speed.

17. In a control system for fluid flow, a hydraulic coupling having an output shaft, a fluid impeller driven by said output shaft for effecting said fluid flow, valve means interposed in the path of said fluid flow, and means for varying the quantity of fluid in said coupling by and in accordance with the position of said valve means.

18. In combination, a hydraulic coupling having an output shaft, a duct, a fan connected to said duct and driven by said output shaft, a damper in said duct, a servo-motor for positioning said damper, means for producing a control force effective for actuating said servo-motor, means actuated by said servo-motor at predetermined positions of said damper for varying the hydraulic fluid in said coupling to effect a change in fan speed and simultaneously independently of the change in fan speed change said control force to effect a positioning of said damper to counteract the said change in fan speed.

19. In combination, a hydraulic coupling having an output shaft, a duct, a fan connected to said duct and driven by said output shaft, a damper in said duct, a servo-motor for positioning said damper, means for producing a control force effective for actuating said servo-motor, means actuated by said servo-motor at predetermined positions of said damper for varying the hydraulic fluid in said coupling to effect a change in fan speed and simultaneously change said control force to effect a positioning of said damper to counteract the said change in fan speed, and retarded means for subsequently annulling said last change in control force.

20. In combination, a hydraulic coupling having an output shaft, a multi-speed motor for driving said coupling, means for producing a control force, means actuated by said control force controlling the admission and discharge of hydraulic fluid to and from the coupling, and means sensitive to a predetermined value of the control force for changing said motor speed and simultaneously independently of the change in output shaft speed caused by the change in motor speed varying the hydraulic fluid in said coupling to vary the speed of the output shaft in opposite sense to that caused by the change in motor speed.

21. A control system, comprising a control couple having relatively movable elements for governing the control force in the system, means for positioning one of said elements responsive to the magnitude of a controlled condition, a regulator for an agent affecting said condition positioned by said control force, and means directly actuated by said regulator for relatively moving said element a predetermined amount at a predetermined position of said regulator.

22. A control system comprising a control couple having relatively movable elements for governing the control force in the system, means for positioning one of said elements responsive to the magnitude of a controlled condition, means for supplying an agent affecting the condition having a plurality of rates of operation, a regulator positioned by said control force for modifying the rate of supply of said agent in accordance with variations in the magnitude of the controlled condition, and means actuated at predetermined positions of said regulator to vary the rate of operation of said supply means and simultaneously independently of the change in rate of operation of said supply means to position said regulator to effect a substantially equal change in the rate of supply of said agent as affected by the change in the rate of operation of said supply means but in opposite sense.

23. A fluid pressure control system comprising a control couple having relatively movable elements for governing the fluid pressure in the system, means for positioning one of said elements responsive to the magnitude of a controlled condition, a regulator for an agent affecting said condition positioned by said fluid pressure, an electric circuit, electro-magnetic means in said circuit for positioning one of said elements, and control means for said circuit actuated by said regulator at a predetermined position thereof.

24. In a combustion control system for a vapor generator, in combination, fuel and air supply means, means for producing a fluid pressure in accordance with the pressure of the vapor generated, regulating means of the fuel supply under the control of said fluid pressure, and means responsive to failure of the air supply means for changing said fluid pressure to cause said regulator to move to a predetermined position.

25. In a combustion control system for a vapor generator, in combination, fuel and air supply means, means for regulating the rate of fuel and air supply, and means responsive to an abnormal condition of said air supply means for causing said regulating means to move to a predetermined position.

26. In a combustion control system for a vapor generator, in combination, fuel and air supply means for the generator, means for producing a first fluid pressure, regulating means of the fuel supply under the control of said first fluid pressure, means for producing a second fluid pressure, regulating means of the air supply under the control of said second fluid pressure, and means for changing both said first and second fluid pressures a predetermined amount to cause said fuel and air regulating means to move to a closed position upon failure of said air supply means.

WALTER E. DUERINGER.